(12) United States Patent
Walshe

(10) Patent No.: US 11,490,596 B2
(45) Date of Patent: *Nov. 8, 2022

(54) SAFE AND HUMANE ANIMAL HEAD COLLAR

(71) Applicant: Kevin Walshe, Dana Point, CA (US)

(72) Inventor: Kevin Walshe, Dana Point, CA (US)

( * ) Notice: Subject to any disclaimer, the term of this patent is extended or adjusted under 35 U.S.C. 154(b) by 403 days.

This patent is subject to a terminal disclaimer.

(21) Appl. No.: 16/775,226

(22) Filed: Jan. 28, 2020

(65) Prior Publication Data

US 2020/0163309 A1    May 28, 2020

Related U.S. Application Data

(63) Continuation of application No. 15/810,032, filed on Nov. 11, 2017, now Pat. No. 10,595,512.

(51) Int. Cl.
*A01K 27/00* (2006.01)
*A01K 25/00* (2006.01)
*B68B 1/02* (2006.01)

(52) U.S. Cl.
CPC ............ *A01K 27/001* (2013.01); *A01K 25/00* (2013.01); *B68B 1/02* (2013.01); *A01K 27/005* (2013.01)

(58) Field of Classification Search
CPC .... A01K 27/001; A01K 27/005; A01K 25/00; B65B 1/02
See application file for complete search history.

(56) References Cited

U.S. PATENT DOCUMENTS

| | | | | |
|---|---|---|---|---|
| 796,025 | A | * | 8/1905 | Wilhelm ................... B68B 1/02 54/24 |
| 4,841,915 | A | * | 6/1989 | Rocchetti ............. A01K 27/001 119/864 |
| 9,781,905 | B2 | * | 10/2017 | Maurer ................ A01K 27/003 |
| 2002/0073936 | A1 | * | 6/2002 | Fields-Babineau .... A01K 27/00 119/863 |
| 2011/0011353 | A1 | * | 1/2011 | Stokes .................... A01K 25/00 119/856 |
| 2011/0083616 | A1 | * | 4/2011 | Elkins .................. A01K 27/003 40/303 |
| 2016/0235038 | A1 | * | 8/2016 | Sinko ................... A01K 27/003 |

* cited by examiner

*Primary Examiner* — Monica L Perry
(74) *Attorney, Agent, or Firm* — Paul A. Gillette

(57) ABSTRACT

A safe and humane head collar for an animal includes a clasp and a head strap extending through first and second channels formed in the clasp. The head strap has a first end secured to a slip loop and a second end secured to a lead attachment. The head strap passes once through the slip loop to form a head loop for passing over a head of the animal. The safe and humane head collar also includes a nose strap extending through third and fourth channels formed in the clasp to provide a nose loop for passing over a nose of the animal, the nose strap having first and second ends terminating below the clasp. When fitted to the animal, the clasp secures a portion the first and second ends of the nose strap and a portion of the head loop below a lower jaw of the animal, and the head loop is positioned so that the slip loop is situated behind an ear of the animal.

20 Claims, 4 Drawing Sheets

SAFE AND HUMANE ANIMAL HEAD COLLAR

RELATED APPLICATIONS

The present application is a continuation of U.S. patent application Ser. No. 15/810,032, filed Nov. 11, 2017, and titled Safe and Humane Animal Head Collar, which claims the benefit of and priority to Provisional Patent Application Ser. No. 62/424,419, filed Nov. 19, 2016, and titled "Safe and Humane Animal Head Collar." The disclosures in these previously filed patent applications are hereby incorporated fully by reference into the present application.

BACKGROUND

Head collars are widely used as training and handling aids. For example, one popular conventional design for a head collar for dogs uses the forward pulling force generated by a dog to redirect the dog's head in a lateral direction, substantially perpendicular to the direction of the forward pulling, causing the dog to turn to the side and even to move in a circular direction if the pulling continues.

Although effective in discouraging pulling and other assertive behaviors, conventional head collar designs that force an animal's head to the side can undesirably inflict pain and/or injury on the animal when certain, relatively common, animal handling techniques are employed. For example, although commonly used, and generally a safe and effective handling technique, leash corrections may be problematic when applied to a dog wearing a conventional head collar.

Specifically, a leash correction intended merely to refocus a dog's attention away from a distraction may unintentionally apply a forceful lateral, sideways, snap to the dog's head, which is inhumane, is likely to inflict substantial discomfort, and may cause serious injury to the dog. Consequently, there is a need in the art for a safe and human head collar designed to avoid the application of a lateral or sideways force to an animal's head when a leash or other type of lead attached to the head collar is pulled, either due to a force applied by the animal or due to a correction technique applied by an animal handler.

SUMMARY

The present application discloses various implementations of a safe and humane animal head collar, substantially as shown in and described by reference to one or more of the figures provided in the present application, and as recited by the claims included herein.

DETAILED DESCRIPTION

Figure 1:
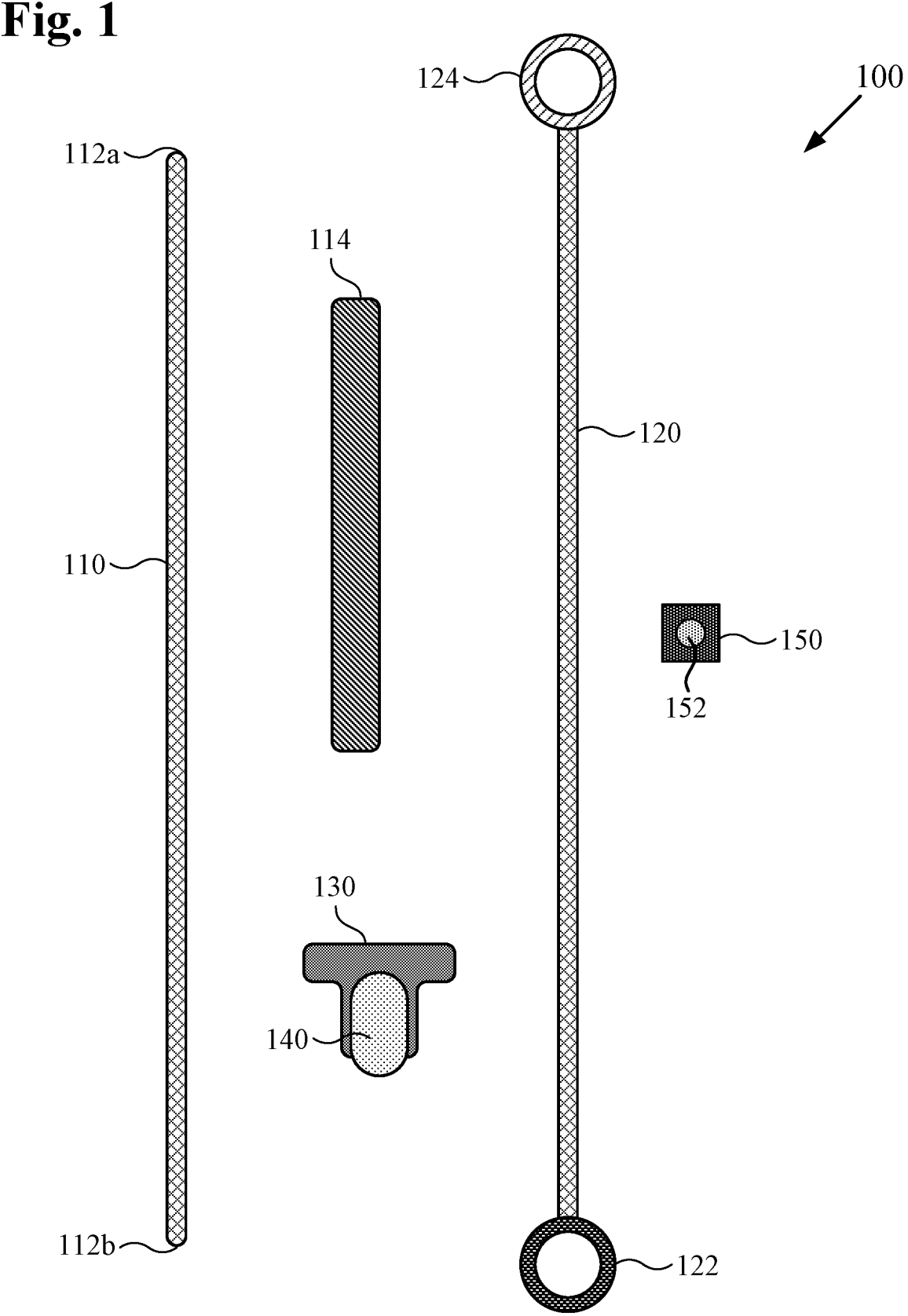
FIG. 1 shows elements of a safe and humane head collar, according to one exemplary implementation of the present inventive concepts.

The following description contains specific information relevant to the inventive concepts disclosed in the present patent application. The person having ordinary skill in the art will recognize that those inventive concepts may be implemented in a manner different from the specific examples discussed below. That is to say, the drawings in the present application and their accompanying detailed description are directed to merely example implementations. Furthermore, the drawings provided in the present application are generally not to scale, and are not intended to depict actual relative dimensions. With respect to like or corresponding elements shown in different drawings, it is noted that such like or corresponding elements may be identified by like or corresponding reference numerals.

Head collars are widely used as training and handling aids, particularly for relatively large and/or willful domestic animals, such as powerful midsized and large dogs, for example. Head collars are typically designed so that when an animal wearing the head collar pulls against a lead or other restraint attached to the head collar, the force generated by the pulling is used to redirect the animal's head, thereby controlling the animal's movement. For example, one popular conventional design for a head collar uses the forward pulling force generated by a dog to redirect the dog's head in a lateral direction, substantially perpendicular to the direction of the forward pulling, causing the dog to turn to the side and even to move in a circular direction if the pulling continues.

Although effective in discouraging pulling and other assertive behaviors, conventional head collar designs that force an animal's head to the side can undesirably inflict pain and/or injury on the animal when certain, relatively common, animal handling techniques are employed. For example, leash corrections are commonly used to encourage obedience in dogs, and involve application of a pulling force on a dog leash, not by the dog, but by the dog's handler. A leash correction is applied when a leash attached to a collar or harness worn by a dog is pulled sharply or snapped to correct misbehavior or to refocus the dog's attention on the handler. Although widely used, and generally a safe and effective handling technique, leash corrections may be problematic when applied to a dog wearing a conventional head collar.

Specifically, a leash correction intended merely to refocus a dog's attention away from a distraction may unintentionally apply a forceful lateral, sideways, snap to the dog's head, which is inhumane, is likely to inflict substantial discomfort, and may cause serious injury to the dog. Consequently, there is a need in the art for a safe and human head collar designed to avoid the application of a lateral or sideways force to an animal's head when a leash or other type of lead attached to the head collar is pulled, either due to a force applied by the animal or due to a correction technique applied by an animal handler.

The present application addresses the shortcomings in conventional head collar designs discussed above by disclosing a safe and humane head collar that substantially avoids the application of a lateral force to an animal's head. Instead, a pulling force applied to a lead coupled to a lead attachment of the head collar, due either to actions by the animal or the animal's handler, results in a vertical deflection of the dog's head that is proportional in force and duration to the pulling force. The sensation produced by such a vertical deflection of the animal's head is sufficiently unwelcome to the animal as to serve as an effective correction, without inflicting substantial discomfort and without risking injury to the animal.

It is noted that although the present inventive concepts will be described by reference to a head collar used on a dog, that representation is provided primarily in the interests of conceptual clarity. More generally, the inventive concepts disclosed in the present application can be suitably adapted for use with other types of animals, such as canines and other non-dog quadrupeds.

FIG. 1 shows elements of a safe and humane head collar, according to one exemplary implementation of the present inventive concepts. As shown in FIG. 1, head collar elements 100 include nose or snout strap 110, and optional nose or snout pad 114 (hereinafter "nose strap 110" and "optional nose pad 114"). As further shown in FIG. 1, head collar elements 100 also include clasp 130, shown as an exemplary T-clasp having lock/release tab 140, head strap 120 secured at opposite ends to slip loop 122 and lead attachment 124, and head strap lock 150 having release 152.

Nose strap 110 and head strap 120 may be implemented using straps, cords, or light ropes formed from organic and/or synthetic materials. Nose strap 110 has opposite nose strap ends 112a and 112b and is designed to control the nose or snout of a dog or other animal wearing a head collar including head collar elements 100, while head strap 120 is designed to control the head of such an animal. As a specific example, according to one implementation and when used as a head collar for a dog, nose strap 110 and head strap 120 may take the form of marine dinghy line having a diameter in a range from approximately two to eight millimeters (approximately 2.0-8.0 mm). It is noted that nose strap 110 and head strap 120 may be formed of the same material or of different materials, and may have the same or different width or diameter.

With respect to length, nose strap 110 is typically shorter than head strap 120. For example, in one implementation, nose strap 110 may be formed of marine dinghy line and have a length in a range from approximately thirty to sixty centimeters (approximately 30-60 cm), while head strap 120 may be formed of the same type of marine dinghy line but have a length of approximately 50-80 cm. It is further noted that the example dimensions of nose strap 110 and head strap 120 provided above may be adapted as needed based on the size and/or power of the dog or other animal wearing a head collar including head collar elements 100.

Optional nose pad 114 may be provided to prevent causing discomfort to a dog or other animal wearing a head collar including head collar elements 100, due to forces on the bridge of the animal's nose or snout applied by nose strap 110. Optional nose pad 114 may be formed from organic and/or synthetic materials, and may be implemented so as to cushion and/or redistribute the force applied by nose strap 110. Consequently, optional nose pad 114 will typically be shorter and wider than nose strap 110, and have a thickness sufficient to assure comfort when nose strap 110 is used to control the animal's nose or snout. For example, in one implementation, optional nose pad 114 may have a length of approximately 20 cm, or less, and a width of approximately 1.5 cm.

In some implementations, optional nose pad 114 may serve a decorative as well as a functional purpose. For example, optional nose pad 114 may be brightly colored so as to serve as a fashion accent to a head collar including head collar elements 100. Moreover, including a brightly colored optional nose pad 114 as a feature of a head collar may have advantages beyond mere aesthetics. For example, when implemented as part of a head collar used to walk a dog belonging to a breed known for aggressiveness, such as a pit bull terrier or mastiff, the presence of brightly colored optional nose pad 114 may lessen the perceived fearsomeness of the dog by other pedestrians, thereby reducing the anxiety level of pedestrians and dog alike. As a specific example, pink or bright yellow optional nose pad 114 may transform an otherwise intimidating looking dog into one that appears attractive and non-threatening.

Clasp 130 is designed to secure opposite ends 112a and 112b of nose strap 110, and a portion of a head loop formed by head strap 120, below the lower jaw of a dog or other animal wearing a head collar including head collar elements 100. Clasp 130 may be formed of plastic, for example, and may be implemented as a T-clasp including lock/release tab 140, which may also be formed of plastic. Lock/release tab 140 can be selectively locked to secure nose strap 110 and head strap 120, and can also be selectively released to enable adjustment of nose strap 110 and/or head strap 120. Additional features and functions of clasp 130 including lock/release tab 140 are described below by reference to FIGS. 2A, 2B, 2C, and 3.

As shown in FIG. 1, slip loop 122 and lead attachment 124 are secured to opposite ends of head strap 120. Slip loop 122 may be formed of a rigid or semi-rigid material, such as metal, plastic, or a semi-rigid polymer, for example. Although slip loop 122 is shown as a substantially circular slip ring in FIG. 1, that representation is provided merely by way of example. More generally, slip loop 122 may be formed as an oval, or may have the shape of a polygon, such as an octagon, for example. Lead attachment 124 is typically formed of a rigid material such as metal. Although lead attachment 124 is shown as a substantially circular ring in FIG. 1, that representation is also provided merely by way of example. More generally, lead attachment 124 may be formed as an oval, or may assume any of various polygonal shapes.

Head strap lock 150 is designed to adjust the fit of head strap 120 on the head of a dog or other animal wearing a head collar including head collar elements 100. In addition, head strap lock 150 ensures that head strap 120 remains securely fitted to the head of a dog or other animal wearing a head collar including head collar elements 100 even when a leash or other type of lead coupled to lead attachment 124 is slack. Head strap lock 150 may be formed of plastic, for example, and includes release 152, which may also may be formed of plastic, and may be implemented as a button or other mechanism for releasing, i.e., unlocking, head strap lock 150.

Figure 2A:
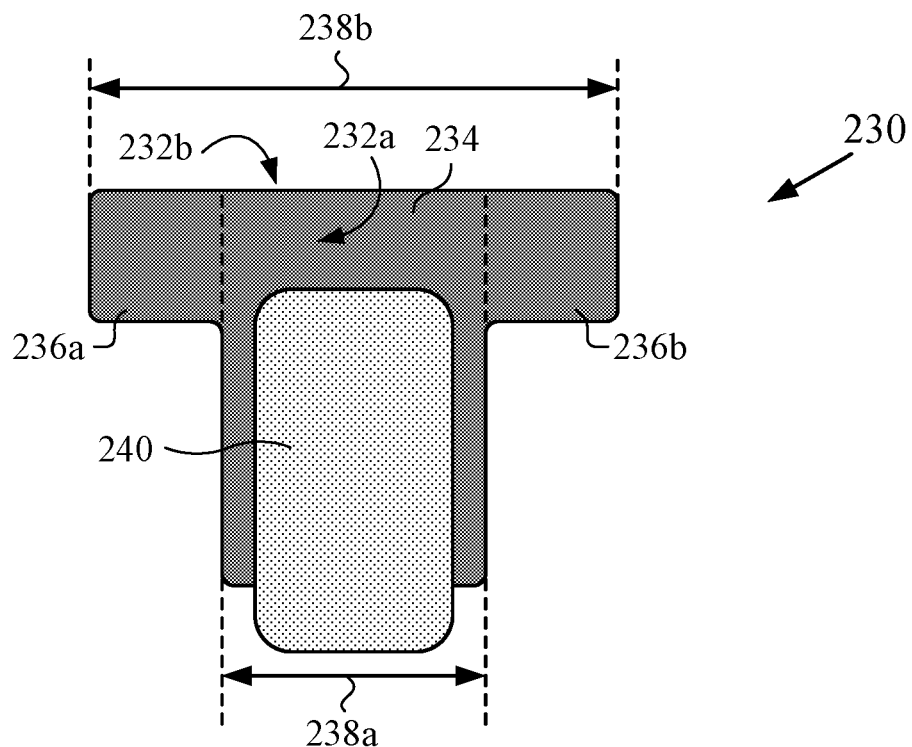
FIG. 2A shows a front side of a clasp included as an element of a safe and humane head collar, according to one exemplary implementation.
Figure 2B:
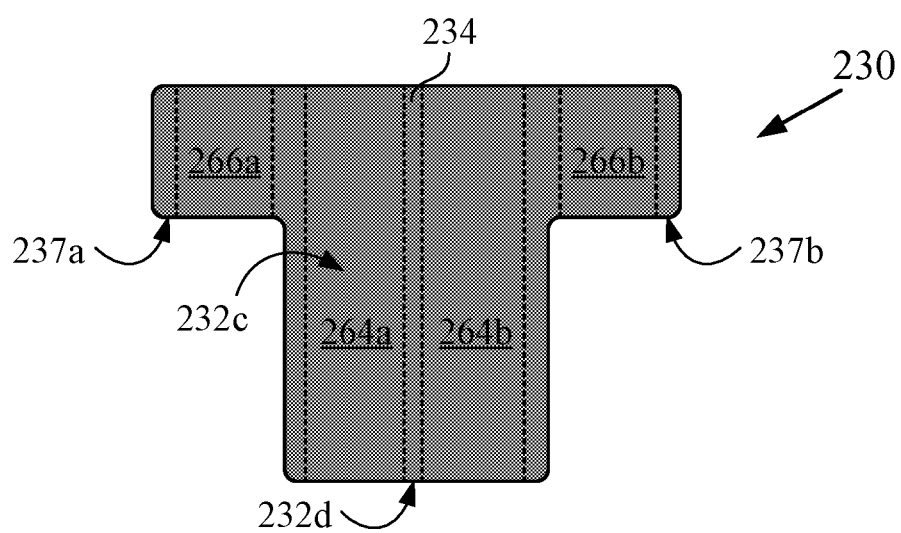
FIG. 2B shows a back side of the clasp of FIG. 2A, according to one exemplary implementation.
Figure 2C:
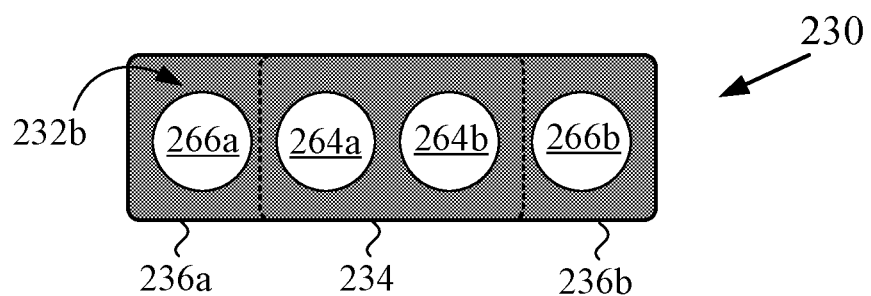
FIG. 2C shows a top surface of the clasp of FIG. 2A, according to one exemplary implementation.

Referring now to FIGS. 2A, 2B, and 2C, FIGS. 2A, 2B, and 2C show a more detailed example implementation of T-clasp 230 including lock/release tab 240 from respective front, back, and top view perspectives. It is noted that T-clasp 230 and lock/release tab 240 correspond respectively to clasp 130 and lock/release tab 140, in FIG. 1, and may share any of the characteristics attributed to any representation of those respective corresponding features in the present application. That is to say, T-clasp 230 and lock/release tab 240 may share any of the characteristics attributed to corresponding respective clasp 130 and lock/release tab 140, above.

FIG. 2A shows front side 232a of clasp 130/230, according to one exemplary implementation. According to the implementation shown in FIG. 2A, clasp 130/230 may be formed of a continuous rigid material, such as molded plastic, and includes central body portion 234 having width 238a, and including lock/release tab 140/240 situated thereon. In addition, clasp 130/230 includes first and second flange portions 236a and 236b formed so as to be continuous with body portion 234, and protruding from opposite sides of body portion 234 at continuous top surface 232b of clasp 130/230. According to one implementation, width 238a of body portion 234 may be in a range from approximately 1.5-2.0 cm, for example, while top surface 232b of clasp 130/230 may have width 238b of approximately 3.0 cm.

FIG. 2B shows back side 232c of clasp 130/230, according to one exemplary implementation. Also shown in FIG. 2B are bottom surface 232d of body portion 234, bottom surfaces 237a and 237b of respective first and second flange portions 236a and 236b, and multiple channels extending through interior portions of clasp 130/230, as indicated by dashed lines in FIG. 2B. The multiple channels formed through clasp 130/230 include nose strap channels 264a and 264b, and head strap channels 266a and 266b. As shown in FIG. 2B, nose strap channels 264a and 264b extend through body portion 234 of clasp 130/230 from top surface 232b to bottom surface 232d. As further shown by FIG. 2B, head strap channel 266a extends through first flange portion 236a of clasp 130/230 from top surface 232b to bottom surface 237a of first flange portion 236a, while head strap channel 266b extends through second flange portion 236b of clasp 130/230 from top surface 232b to bottom surface 237b of second flange portion 236b.

FIG. 2C shows top surface 232b of clasp 130/230, according to one exemplary implementation. As shown in FIG. 2C, top surface 232b is a continuous top surface provided by body portion 234 and first and second flange portions 236a and 236b. Also shown in FIG. 2C are channel openings in top surface 232b due to the formation of nose strap channels 264a and 264b, and head strap channels 266a and 266b, through clasp 130/230. It is noted that opposite channel openings corresponding respectively to nose strap channels 264a and 264b are formed at bottom surface 232d of body portion 234. It is further noted that an opposite channel opening corresponding to head strap channel 266a is formed at bottom surface 237a of first flange portion 236a, and an opposite channel opening corresponding to head strap channel 266b is formed at bottom surface 237b of second flange portion 236b.

Nose strap channels 264a and 264b are provided to enable passage of nose strap 110, shown in FIG. 1, through body portion 234 of clasp 130/230. Analogously, head strap channels 266a and 266b are provided to enable passage of head strap 120 through respective first and second flange portions 236a and 236b of clasp 130/230. Although the channel openings shown in FIG. 2C are depicted as substantially circular channel openings, that representation is merely by way of example. For instance, although oval or substantially circular channel openings may be advantageous or desirable when nose strap 110 and head strap 120 are implemented using cords, such as the marine dinghy line described above, channel openings in the form of slits, slots, or grooves may be utilized when nose strap 110 and/or head strap 120 assume a different shape, such as that of a flat strap.

Referring to FIGS. 2A, 2B, and 2C in combination, lock/release tab 140/240 is designed to lock and release clasp 130/230 to nose strap 110 when nose strap 110 extends through nose strap channels 264a and 264b. Lock/release tap 140/240 may be formed of a rigid material, such as plastic or metal, for example, and may be coupled to T-Clasp 130/230 so as to enable lock/release tab 140/240 to selectively lock nose strap 110. Lock-release tab 140/240 is designed to selectively apply pressure to sections of nose strap 110 situated within nose strap channels 264a and 264b, thereby locking the position of nose strap 110 within nose strap channels 264a and 264b. Lock-release tab 140/240 is also designed to selectively release the locking pressure on nose strap 110, thereby allowing nose strap 110 to slide freely within nose strap channels 264a and 264b.

Lock/release tab 140/240 may be coupled to clasp 130/230 using any suitable mechanical connection. For example, in one implementation, lock/release tab 140/240 may be coupled to clasp 130/230 by first and second hinge pins inserted into or through outer sidewalls of body portion 234 adjoining respective nose strap channels 264a and 264b. In some implementations, lock/release tab 140/240 may be designed to release automatically under certain conditions. For example, in one implementation, lock/release tab 140/240 may be designed to release when segments of nose strap 110 including respective nose strap ends 112a and 112b and extending below bottom surface 232d of body portion 234 are tugged firmly downward, i.e., in a direction through nose strap channels 264a and 264b from top surface 232b toward bottom surface 232d.

Figure 3:
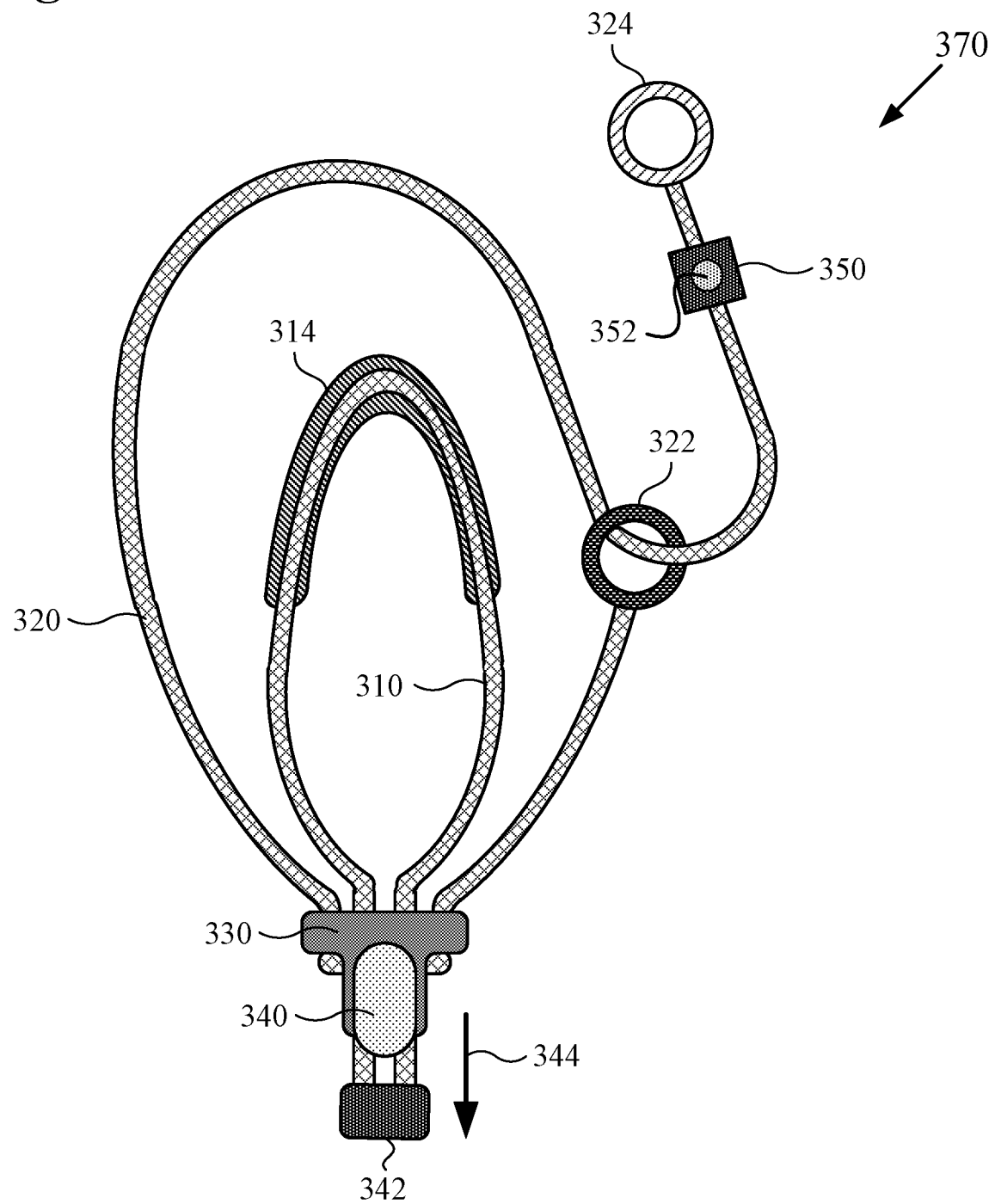
FIG. 3 shows a safe and humane head collar, according to one exemplary implementation of the present inventive concepts.

Continuing to FIG. 3, FIG. 3 shows a safe and humane head collar, according to one exemplary implementation of the present inventive concepts. FIG. 3 shows head collar 370 composed from head collar elements 100 shown in FIG. 1. As shown in FIG. 3, head collar 370 includes nose strap 310, optional nose pad 314, clasp 330 including lock/release tab 340, head strap 320 secured at opposite ends to slip loop 322 and lead attachment 324, and head strap lock 350 having release 352. Also shown in FIG. 3 is nose strap cap or clip 342 covering opposite nose strap ends 112a and 112b in FIG. 1.

Nose strap 310, optional nose pad 314, and clasp 330 including lock/release tab 340 correspond respectively to nose strap 110, optional nose pad 114, and clasp 130 including lock/release tab 140, in FIG. 1, and may share any of the characteristics attributed to any representation of those respective corresponding features in the present application. Moreover, head strap 320, slip loop 322, lead attachment 324, and head strap lock 350 having release 352 correspond respectively to head strap 120, slip loop 122, lead attachment 124, and head strap lock 150 having release 152, and may share any of the characteristics attributed to any representation of those respective corresponding features in the present application. In addition, clasp 330 and lock/release tab 340 correspond respectively to T-clasp 230 and lock/release tab 240, in FIGS. 2A, 2B, and 2C, and may share any of the characteristics attributed to any representation of those respective corresponding features in the present application.

As shown in FIG. 3, nose strap 110/310 extends through nose strap channels 264a and 264b formed in body portion 234 of clasp 130/230/330 so as to provide a nose loop for passing over the nose of a dog or other animal. According to the implementation shown in FIG. 3, the loop formed by nose strap 110/310 includes optional nose pad 114/314, which may be sewn or otherwise affixed to a section of nose strap 110/310. FIG. 3 also shows that the ends of respective segments of nose strap 110/310 including opposite nose strap ends 112a and 112b and extending below body portion 234 of clasp 130/230/330 may be secured together, for example by being fused together, or using optional cap or clip 342.

As discussed above, lock-release tab 140/240/340 is designed to selectively apply pressure to sections of nose strap 110/310 situated within nose strap channels 264a and 264b, thereby locking the position of nose strap 110/310 within nose strap channels 264a and 264b. Lock-release tab 140/240/340 is also designed to selectively release the locking pressure on nose strap 110/310, thereby allowing nose strap 110/310 to slide freely through clasp 130/230/330 within nose strap channels 264a and 264b. As further discussed above, in some implementations, lock/release tab 140/240/340 may be designed to release automatically when respective segments of nose strap 110/310 including opposite nose strap ends 112a and 112b and extending below bottom surface 232d of body portion 234 are tugged firmly downward and away from clasp 130/230/330, i.e., in direction 344 shown in FIG. 3.

As further shown in FIG. 3, head strap 120/320 extends through head strap channels 266a and 266b formed in respective first and second flange portions 236a and 236b, and further passes behind back side 232c of body portion 234 of clasp 130/230/330 below first and second flange portions 236a and 236b. In addition, head strap 120/320 passes through slip loop 122/322 one time, so as to form a head loop for passing over the head of a dog or other animal. Moreover, and as also shown in FIG. 3, head strap lock 150/350 including release 152/352 is attached to head strap 120/320 between the portion of head strap 120/320 passing through slip loop 122/322 and lead attachment 124/324. As a result, slip loop 122/322 is situated between lead attachment 124/324 and clasp 130/230/330, and head strap lock 150/350 is situated between lead attachment 124/324 and slip loop 120/320.

According to the example implementation shown in FIG. 3, head collar 370 advantageously allows head strap 120/320 to move freely through slip loop 122/322, thereby enabling the head loop formed by head strap 120/320 to adjust automatically to forces applied due to pulling by the dog or other animal wearing head collar 370, or due to actions of a handler of the dog or other animal wearing head collar 370. Head strap lock 150/350 can be used to fit the head loop formed by head strap 120/320 to the head of the dog or other animal wearing head collar 370. Release 152/352 of head strap lock 150/350 frees head strap 120/320 from the locking action of head strap lock 150/350 and allows the head loop formed by head strap 120/320 to be manually tightened or loosened. Head strap lock 150/350 ensures that head strap 120/320 remains securely fitted to the head of the dog or other animal wearing head collar 370 even when a leash or other type of lead coupled to lead attachment 124/324 is slack.

It is emphasized that head collar 370 can be implemented with no more than head collar elements 100 shown in FIG. 1. In other words, in various implementations, head collar 370 may include two straps, i.e., nose strap 110/310 and head strap 120/320, but not more than two straps. Moreover, it is further emphasized that head collar 370 can be implemented without straps or loops to restrain or control other portions of an animal's body, such as a chest strap or torso strap, for example. In addition, it is noted that the nose loop formed by nose strap 110/310 and the head loop formed by head strap 120/320 may be implemented as "one size fits all" features across a broad spectrum of animal sizes and builds. For example, when head collar is implemented for use as a head collar for dogs, the same nose strap 110/310 and head strap 120/320 having the same dimensions and formed of the same materials can be used to properly fit and control a dog ranging in weight from approximately ten pounds (10 lbs.) to approximately one hundred and twenty pounds (120 lbs.).

Figure 4:
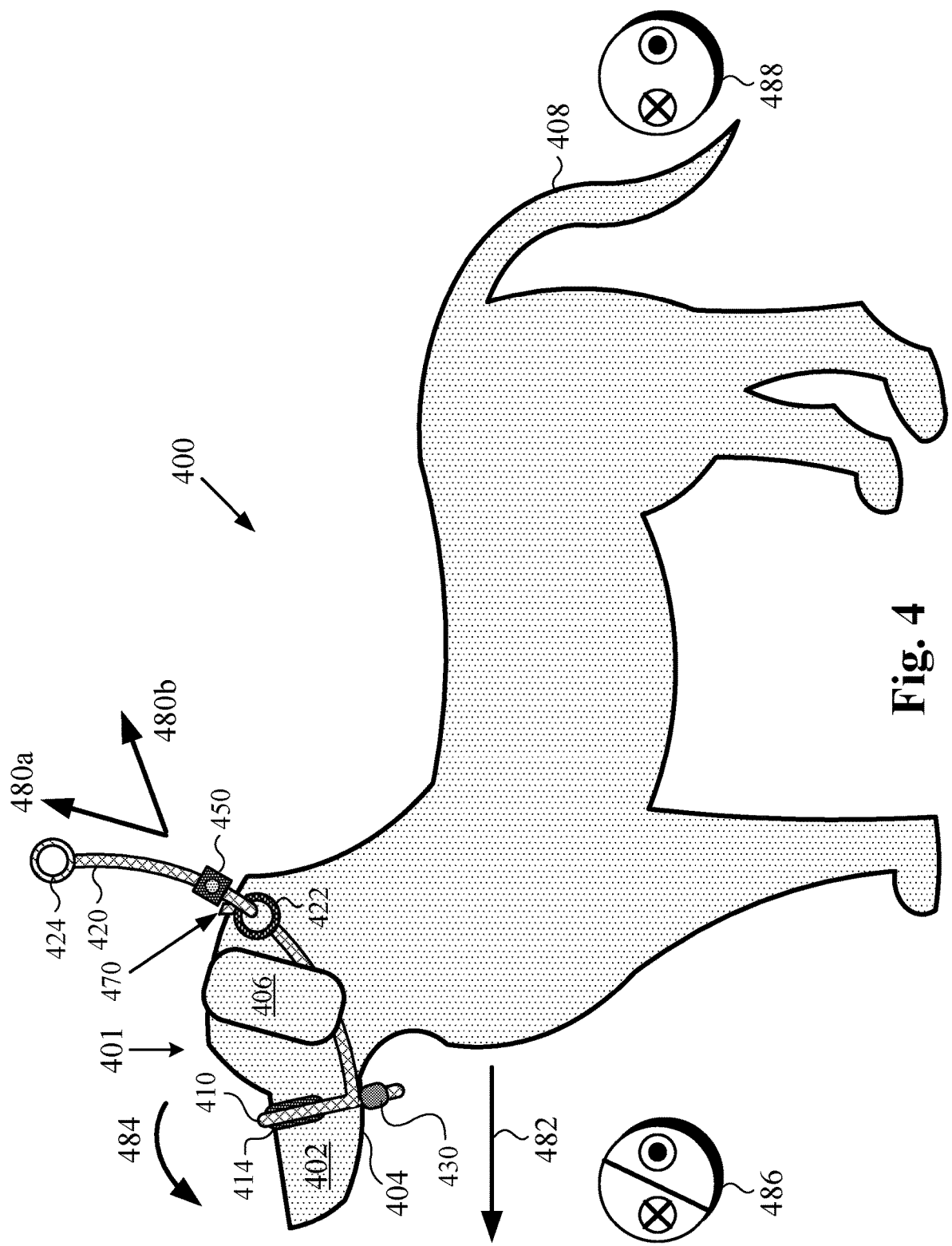
FIG. 4 shows a safe and humane head collar according to one exemplary implementation of the present inventive concepts, fitted to a dog.

Referring now to FIG. 4, FIG. 4 shows dog 400 fitted with safe and humane head collar 470, according to one exemplary implementation of the present inventive concepts. As shown in FIG. 4, head collar 470 includes nose strap 410, optional nose pad 414, clasp 430, head strap 420 secured at opposite ends to slip loop 422 and lead attachment 424, and head strap lock 450 having release 452. In addition, FIG. 4 shows head 401, nose 402, lower jaw, 404, ear 406, and tail 408 of dog 400. Also shown in FIG. 4 are restraint force directions 480a and 480b, pulling force direction 482, correction force direction 484, directional indicator 486 representing the absence of lateral motion, i.e., motion perpendicular to the plane of the page of FIG. 4, and directional indicator 488 representing the occurrence of such lateral motion.

Head collar 470 corresponds to head collar 370, in FIG. 3, and may share any of the characteristics attributed to that corresponding feature in the present application. Thus, nose strap 410, optional nose pad 414, and clasp 430 correspond respectively to nose strap 110/310, optional nose pad 114/314, and clasp 130/330, in FIG. 1/3, and may share any of the characteristics attributed to those respective corresponding features in the present application. Moreover, head strap 420, slip loop 422, lead attachment 424, and head strap lock 450 having release 452 correspond respectively to head strap 120/320, slip loop 122/322, lead attachment 124/324, and head strap lock 150/350 having release 152/352, and may share any of the characteristics attributed to those respective corresponding feature(s) in the present application. In addition, clasp 430 corresponds to T-clasp 230, in FIGS. 2A, 2B, and 2C, and may share any of the characteristics attributed to that corresponding feature in the present application.

As shown in FIG. 4, the nose loop provided by nose strap 110/310/410 passes over nose 402 of dog 400. In implementations including optional nose pad 114/314/414, optional nose pad 114/314/414 overlays nose 402 of dog 400, and is situated between nose strap 110/310/410 and nose 402 of dog 400. Head strap 120/320/420 passes once through slip loop 122/322/422 so as to form a head loop passing behind ear 406 of dog 400 to surround head 401 of dog 400. The nose loop formed by nose strap 110/310/410 and the head loop formed by head strap 120/320/420 are secured by clasp 130/230/330/430, which is positioned below lower jaw 404 of dog 400. That is to say, opposite ends 112a and 112b of nose strap 120/320/420 and the portion of the head loop formed by head strap 120/320/420 that passes under head 401 of dog 400 are secured below lower jaw 404 of dog 400.

It is emphasized that head collar 370/470 is configured such that opposite ends 112a and 112b of nose strap 120/320/420 and the portion of the head loop formed by head strap 120/320/420 that passes under head 401 are secured by clasp 130/230/330/430 below lower jaw 404 of dog 400, but not behind lower jaw 404 of dog 400. That is to say, when fitted to dog 400, opposite ends 112a and 112b of nose strap 120/320/420 and the portion of the head loop formed by head strap 120/320/420 that passes under head 401 secured by clasp 130/230/330/430 do not impinge upon of constrict the throat or neck of dog 400, thereby desirably enabling the breathing of dog 400 to remain substantially unconstrained.

It is noted that the head loop formed by head strap 120/320/420 is positioned such that slip loop 122/322/422 is situated behind ear 406 of dog 400, and at or near the top and back of head 401 of dog 400. It is further noted that head strap lock 150/350/450 is positioned such that the head loop formed by head strap 120/320/420 remains securely fitted to head 401 of dog 400 wearing head collar 370/470 even when a leash or other type of lead coupled to lead attachment 124/324/424 is slack.

According to the implementation shown in FIG. 4, pulling by dog 400 in direction 482 pulls on head strap 120/320/420 so as to, in effect, generate a restraint force approximately in direction 480*b*. That restraint force is transferred to the loop formed by nose strap 110/310/410 by clasp 130/230/330/430, and causes head 401 of dog 400 to be tipped nose downward, i.e., substantially vertically deflected, in direction 484 by a correction force applied by head collar 370/470. Similarly, a restraint force applied by a handler of dog 400, either substantially upward in direction 480*a*, or substantially backward in direction 480*b*, is transferred to the loop formed by nose strap 110/310/410 by clasp 130/230/330/430, and causes head 401 of dog 400 to be substantially vertically deflected in direction 484 by a correction force generated by head collar 370/470.

Head collar 370/470 overcomes the disadvantages resulting from conventional head collar designs by substantially preventing the application of a lateral force to head 401 of dog 400, as shown by directional indicator 486 representing the absence of lateral motion, i.e., motion perpendicular to the plane of the page of FIG. 4, by head 401 of dog 400. Instead, a force applied to a lead attached to head collar 370/470, due either to actions by dog 400 or a restraint or correction imposed by a handler of dog 400, results in a substantially vertical deflection of head 401 of dog 400 in direction 484. The sensation produced by such a vertical deflection in direction 484 may be sufficiently unwelcome to dog 400 as to serve as an effective correction without inflicting substantial discomfort and without risking injury to dog 400. Consequently, head collar 370/470 can make the experience of walking dog 400 safer and more enjoyable for both a handler of dog 400 and dog 400 itself, thereby resulting in considerable lateral movement of tail 408, i.e., wagging, as shown by directional indicator 488.

Thus, the present application discloses a head collar enabling an animal handler to exercise safe and humane control over an animal, such as a dog or similarly sized quadruped. From the above description it is apparent to the person of ordinary skill in the art that various techniques can be used to implement the inventive concepts described in the present application without departing from their scope. As a result, and although the present inventive concepts have been described by reference to certain specific implementations, the person of ordinary skill in the art would recognize that changes can be made in form and detail while remaining within the scope of those inventive concepts. Consequently, the example implementations described above are to be interpreted as illustrative rather than restrictive.

The invention claimed is:

1. A head collar for an animal, the head collar comprising:
   a clasp;
   a head strap extending through first and second channels formed in the clasp, the head strap having a first end secured to a slip loop and a second end secured to a lead attachment;
   a nose strap extending through third and fourth channels formed in the clasp to provide a nose loop for passing over a nose of the animal, the nose strap having first and second ends terminating below the clasp;
   the head strap passing once through the slip loop to form a head loop for passing over a head of the animal;
   wherein when fitted to the animal, the clasp is positioned below a lower jaw of the animal and secures the first and second ends of the nose strap and a portion of the head loop below the lower jaw of the animal, and the head loop is positioned so that the slip loop is situated behind an ear of the animal.

2. The head collar of claim 1, wherein when fitted to the animal, the slip loop is situated near a top and back of the head of the animal.

3. The head collar of claim 1, wherein when fitted to the animal, a pulling force applied to a lead coupled to the lead attachment results in a substantially vertical deflection nose downward of the head of the animal.

4. The head collar of claim 1, wherein the head collar is configured to prevent a substantially lateral deflection sideways of the head of the animal in response to a pulling force applied to a lead coupled to the lead attachment.

5. The head collar of claim 1, wherein the clasp is configured to selectively lock the nose strap in the third and fourth channels formed in the clasp and to selectively release the nose strap to move within the third and fourth channels.

6. The head collar of claim 5, wherein the clasp is configured to release the nose strap to move within the third and fourth channels automatically in response to a vertical tugging force applied to the first and second ends of the nose strap.

7. The head collar of claim 1, further comprising a head strap lock situated between the lead attachment and the slip loop, the head strap lock configured to ensure that the head strap remains securely fitted to the head of the animal when a lead coupled to the lead attachment is slack.

8. A head collar for an animal, the head collar comprising:
   a clasp;
   not more than two straps, the two straps including a head strap and a nose strap but not a chest strap or a torso strap;
   the head strap extending through first and second channels formed in the clasp, the head strap having a first end secured to a slip loop and a second end secured to a lead attachment;
   the nose strap extending through third and fourth channels formed in the clasp to provide a nose loop for passing over a nose of the animal, the nose strap having first and second ends terminating below the clasp;
   the head strap passing once through the slip loop to form a head loop for passing over a head of the animal;
   wherein when fitted to the animal, the clasp secures the first and second ends of the nose strap and a portion of the head loop below a lower jaw of the animal, and the head loop is positioned so that the slip loop is situated behind an ear of the animal.

9. The head collar of claim 8, wherein when fitted to the animal, the slip loop is situated near a top and back of the head of the animal.

10. The head collar of claim 8, wherein when fitted to the animal, a pulling force applied to a lead coupled to the lead attachment results in a substantially vertical deflection nose downward of the head of the animal.

11. The head collar of claim 8, wherein the head collar is configured to prevent a substantially lateral deflection sideways of the head of the animal in response to a pulling force applied to a lead coupled to the lead attachment.

12. The head collar of claim 8, wherein the clasp is configured to selectively lock the nose strap in the third and fourth channels formed in the clasp and to selectively release the nose strap to move within the third and fourth channels.

13. The head collar of claim 12, wherein the clasp is configured to release the nose strap to move within the third and fourth channels automatically in response to a vertical tugging force applied to the first and second ends of the nose strap.

14. The head collar of claim 8, further comprising a head strap lock situated between the lead attachment and the slip loop, the head strap lock configured to ensure that the head strap remains securely fitted to the head of the animal when a lead coupled to the lead attachment is slack.

15. A head collar for a dog, the head collar comprising:
a clasp;
a head strap extending through first and second channels formed in the clasp, the head strap having a first end secured to a slip loop and a second end secured to a lead attachment;
a nose strap extending through third and fourth channels formed in the clasp to provide a nose loop for passing over a nose of the dog, the nose strap having first and second ends terminating below the clasp;
the head strap passing once through the slip loop to form a head loop for passing over a head of the dog;
wherein when fitted to the dog, the clasp is positioned below a lower jaw of the dog and secures the first and second ends of the nose strap and a portion of the head loop below the lower jaw of the dog, and the head loop is positioned so that the slip loop is situated behind an ear of the dog: and
wherein the nose strap and the head strap are configured to fit and control a dog ranging in weight from less than twenty pounds to more than one hundred pounds.

16. The head collar of claim 15, wherein when fitted to the dog, a pulling force applied to a lead coupled to the lead attachment results in a substantially vertical deflection nose downward of the head of the dog.

17. The head collar of claim 15, wherein the head collar is configured to prevent a substantially lateral deflection sideways of the head of the dog in response to a pulling force applied to a lead coupled to the lead attachment.

18. The head collar of claim 15, wherein the clasp is configured to selectively lock the nose strap in the third and fourth channels formed in the clasp and to selectively release the nose strap to move within the third and fourth channels.

19. The head collar of claim 18, wherein the clasp is configured to release the nose strap to move within the third and fourth channels automatically in response to a vertical tugging force applied to the first and second ends of the nose strap.

20. The head collar of claim 15, further comprising a head strap lock situated between the lead attachment and the slip loop, the head strap lock configured to ensure that the head strap remains securely fitted to the head of the dog when a lead coupled to the lead attachment is slack.

* * * * *